United States Patent [19]

Curtiss, Jr. et al.

[11] 4,077,455
[45] Mar. 7, 1978

[54] RADIAL PLY PNEUMATIC TIRE AND RIM ASSEMBLY

[75] Inventors: Walter W. Curtiss, Jr., Brimfield; Joseph M. Forney, Akron, both of Ohio

[73] Assignee: The Goodyear Tire & Rubber Company, Akron, Ohio

[21] Appl. No.: 646,714

[22] Filed: Jan. 5, 1976

[51] Int. Cl.² .................. B60C 9/02; B60C 15/00
[52] U.S. Cl. .................... 152/354 R; 152/362 R; 301/97
[58] Field of Search ........... 152/354, 362 R, 362 CS, 152/330 RF; 301/97, 98

[56] References Cited

U.S. PATENT DOCUMENTS

| | | | |
|---|---|---|---|
| 3,486,547 | 12/1969 | Powers | 152/330 RF |
| 3,910,336 | 10/1975 | Boileau | 152/354 |
| 3,951,192 | 4/1976 | Gardner et al. | 152/362 CS |

OTHER PUBLICATIONS

Kunststofftechnik, published in Germany, Jan. 1971 to May 1972, "The Cross-sectional Shape of Conventional and Radial Ply Tires," Frank and Seggelke.

*Primary Examiner*—Robert B. Reeves
*Assistant Examiner*—Francis J. Bartuska
*Attorney, Agent, or Firm*—F. W. Brunner; R. P. Yaist

[57] ABSTRACT

A radial ply tire and rim assembly in which the tire has an aspect ratio of less than 70 percent and a bead spacing of no greater than 65 percent of the maximum axial width of the inflated tire. The rim has a pair of axially extending flanges which engage the lower sidewall of the tire and distort the carcass from its natural equilibrium curvature without causing any reversal of curvature of the carcass.

26 Claims, 3 Drawing Figures

RADIAL PLY PNEUMATIC TIRE AND RIM ASSEMBLY

The foregoing abstract is not to be taken as limiting the invention of this application, and in order to understand the full nature and extent of the technical disclosure of this application, reference must be made to the accompanying drawings and the following detailed description.

This invention relates to pneumatic tires and more particularly to a radial ply tire and rim assembly.

It is known that while it is desirable to improve ride, durability and handling in pneumatic tires, usually an improvement in one of these qualities is accompanied by a partial degradation of one or more of the others. For example, the lateral stability and handling properties of a radial ply tire can be improved by providing stiffening members in the bead area and sidewalls adjacent the bead areas. This procedure, however, tends to cause a reduction in the riding quality of the tire.

It has also been suggested, for example, in U.S. Pat. No. 3,910,336 that the natural equilibrium curvature of the carcass structure be maintained from at least the mid-height of the sidewall until the carcass becomes tangent to the bead. This principle is also presented in *Mathematics Underlying the Design of Pneumatic Tires,* second editing, by John F. Purdy, Hiney Printing Company. Particularly, see Pages 130 to 137.

According to the present invention, however, a low profile radial ply tire is mounted on a special rim having a narrow bead spacing and a pair of axially extending stabilizer flanges. Each axially extending flange is designed to distort the carcass from its natural equilibrium curvature without causing any reversal of curvature in the carcass structure. Each stabilizer flange extends in axial directions over a distance at least equal to 10 percent of the maximum axial width of the inflated tire. The carcass ply, as it approaches each bead core curves axially inwardly to form a small angle with a line parallel to the rotational axis of the tire.

The preload of the carcass structure on specially designed stabilizer flanges provides quicker response and better lateral stability without the provision of additional reinforcing members in the lower sidewall and bead area. The lack of extra components in this lower sidewall area tends to reduce the possibility of failure of the various components in this area and the entire sidewall is free to flex in the radial direction to provide good riding qualities.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
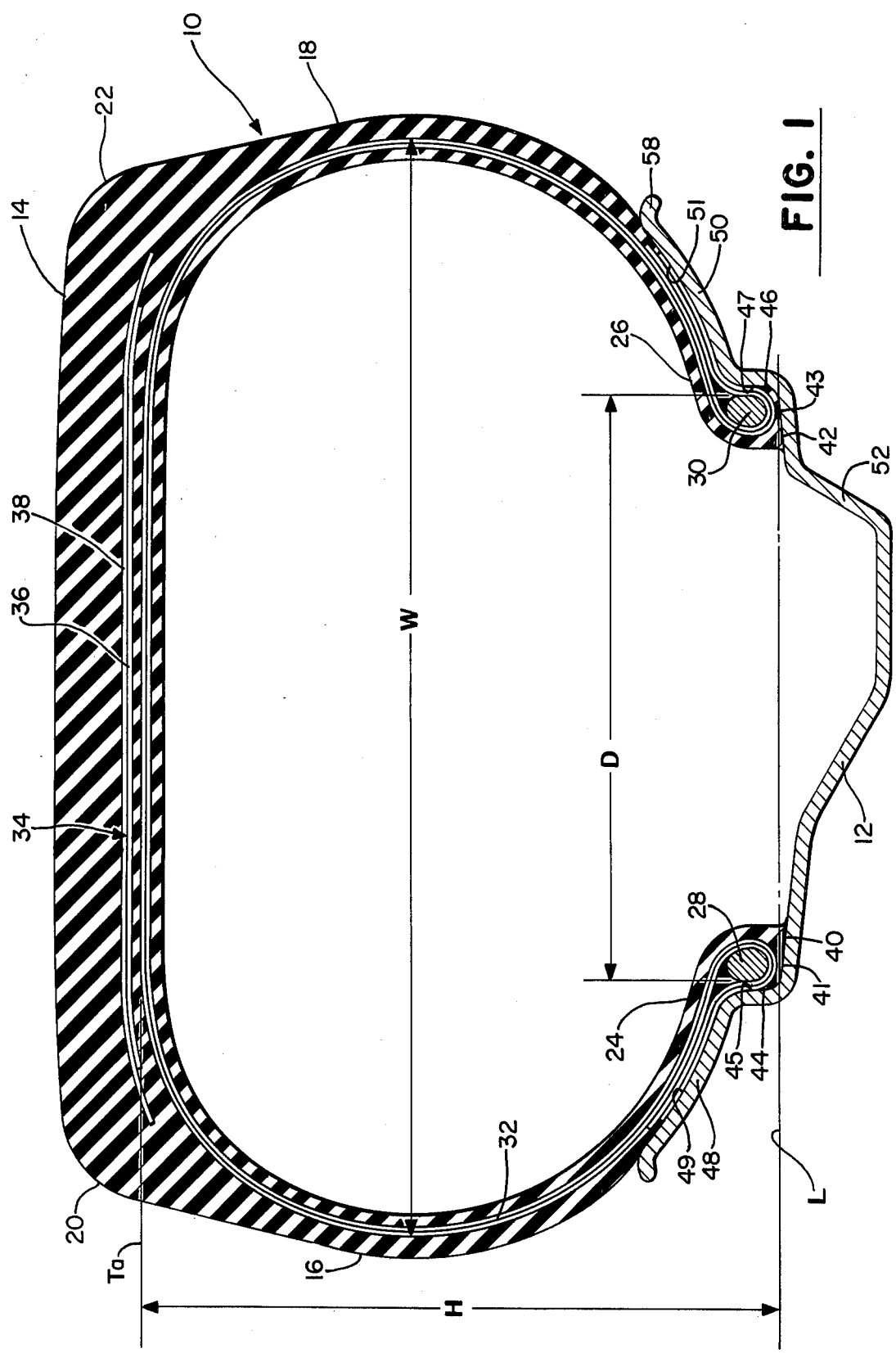
FIG. 1 is a cross-sectional view of a tire and rim assembly made in accordance with the present invention.

With reference to the drawings and in particular FIG. 1, there is illustrated a tire 10 mounted on a rim 12 and inflated to design inflation pressure. For purposes of this invention, design inflation pressure shall be considered the average of the maximum and minimum design inflation pressures.

The tire 10 includes a circumferentially extending tread portion 14 and a pair of sidewall portions 16, 18 extending radially inwardly from the axially outer edges or shoulder portions 20, 22 of the tread portion 14. The sidewall portions 16 and 18 curve axially inwardly toward each other at their radially inner ends and terminate in a pair of bead portions 24, 26. Each bead portion 24, 26 includes a circumferentially extending inextensible bead core 28, 30. A carcass structure 32 having its cords laying in planes containing the rotational axis of the tire extends circumferentially about the tire 10 and from bead core 28 to bead core 30.

For purposes of this invention, the dimensions and proportions of the tire are determined when the tire is inflated to design inflation pressure and in a static, unloaded condition as illustrated in FIG. 1. The section height H of the tire 10 is the radial distance from the bead base line L to a tangent $T_a$ to the radially outermost extremity of the carcass structure 32. The section width W is the axial distance between the axially outermost extremities of the carcass structure 32. A tire 10 made in accordance with the present invention has an aspect ratio H/W which is no greater than 0.75 or 75 percent and preferably from about 40 to about 60 percent.

Although two carcass plies are illustrated, any suitable number of carcass plies could be utilized. Further, for purposes of this invention, a radial ply tire shall be construed to include pneumatic tires in which all of the cords in the sidewall extend at angles no greater than 15° with respect to planes containing the rotational axis of the tire over a radial extent of the sidewall equal to at least 50 percent of the section height H of the tire.

The tire 10 also includes a circumferentially extending belt structure 34 disposed radially outwardly of the carcass structure 32 and extending in axial directions substantially from the shoulder portion 20 to the shoulder portion 22. Although, in the particular embodiment illustrated, two belt plies 36 and 38 are illustrated, it will be appreciated that any number of belt plies suitable for the specific application may be utilized. The cords in the belt plies may extend parallel to the circumferential centerline of the tire or they may extend at any suitable bias angle with respect to the circumferential centerline.

Further, it will be appreciated that any material suitable for the particular application may be utilized for the carcass structure 32 and the belt structure 34, such as, by way of example only, nylon, rayon, polyester, fiberglass, steel, or aramid.

The rim 12 includes a pair of conical or tapered bead seats 40 and 42 having a bead seat surface 41 and 43, respectively. A pair of bead registers 44 and 46 each having a bead register suface 45 and 47, respectively, extend radially outwardly from the respective axially outer edges of the bead seats 40 and 42. A pair of annular stabilizer flanges 48 and 50, each having a flange surface 49 and 51, respectively, extend axially outwardly of and from the radially outer extremities of the respective bead registers 44 and 46. In the particular embodiment illustrated, the rim includes a drop center well 52 to facilitate mounting the tire 10 on the rim 12. It will be appreciated, however, that the drop center well 52 could be eliminated and the tire could be mounted on a split rim or a rim of the type having a demountable flange. Both rim constructions are well known in the art and not considered a part of the present invention and will, therefore, not be discussed in further detail herein.

The axial distance D between the bead seat surfaces 41 and 43 is no greater than 65 percent of the section width W of the carcass structure 32.

Figure 2:
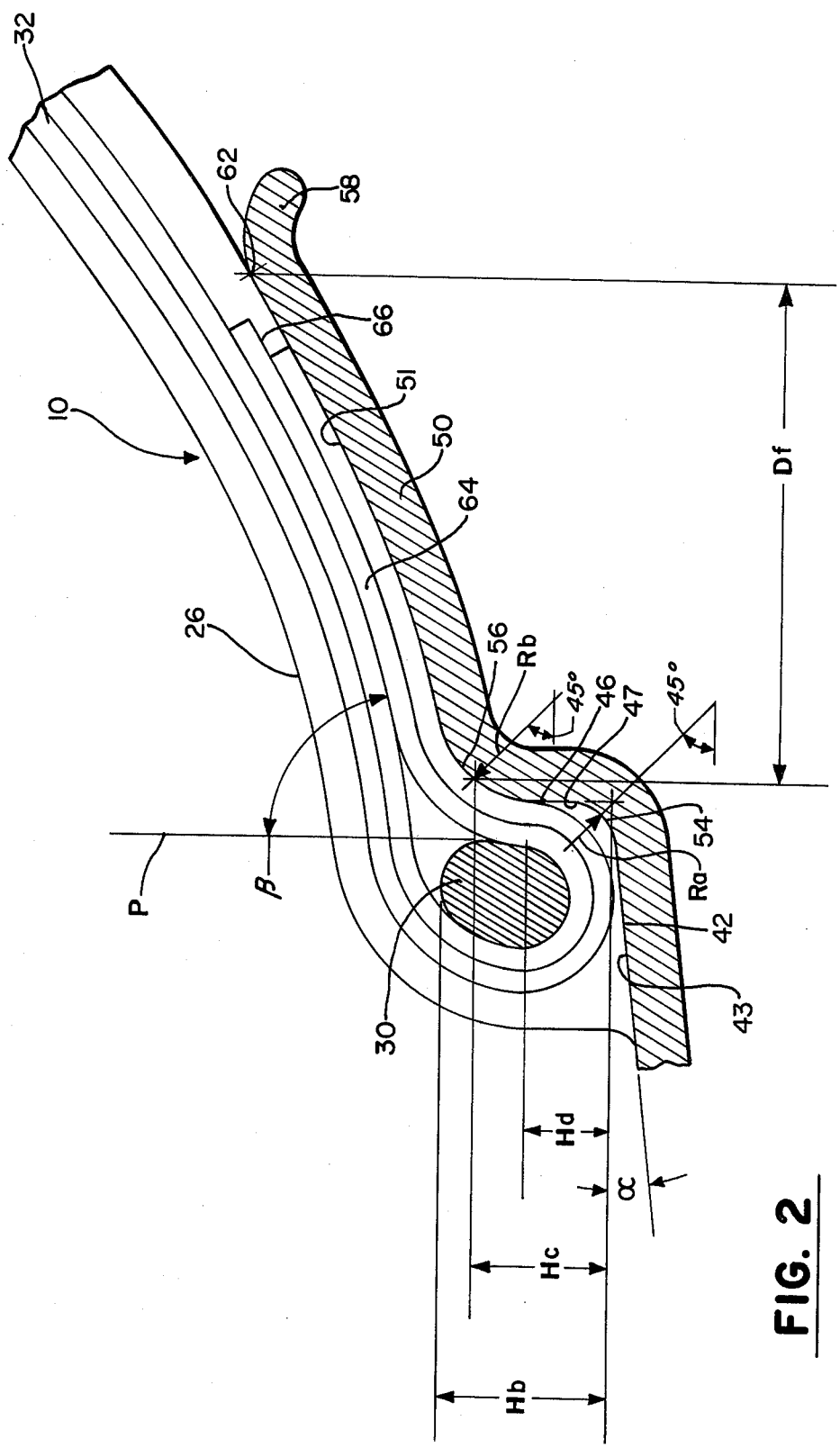
FIG. 2 is an enlarged view of the flange and bead area of the tire of FIG. 1.

More particularly and with reference to FIG. 2, there is illustrated an enlarged view of the bead portion 26 of the tire 10 of FIG. 1. Only one bead portion 26 will be described herein, it being understood that both bead portions 24 and 26 are similar. For purposes of clarity, the same numerals used in FIG. 1 will be used for corresponding parts in FIG. 2. The bead seat 42 as noted above is generally conical and may have its bead seat surface 43 extending at an angle alpha ($\alpha$) with respect to the rotational axis of the tire of from 5 to 15 degrees. Bead seat surface 43 merges with the bead register surface 47 through a curved portion 54. The bead register surface 47 merges with the flange surface 51 through another curved portion 56. For purposes of this invention the bead register surface 47 shall extend between the radius $R_a$ of the curved portion 54 to the radius $R_b$ of the curved portion 56 with both the radius $R_a$ and the radius $R_b$ extending at an angle of 45 degrees with respect to the rotational axis of the tire 10.

In accordance with the present invention, the bead register surface 47 extends radially outwardly to a height $H_c$ between height $H_d$, 30 percent of the radial height of the bead core 26 and radially outer extent $H_b$ of the adjacent bead core 26.

The flange 50 terminates at its axially outer end in a portion 58 which curves back toward the rotational axis of the tire. The contact surface 51 of the flange 50 extends in axial directions for a distance $D_f$ equal to at least 10 percent of the section width W of the carcass structure 32. The contact surface 51 is parallel to the carcass structure 32 from the initial contact point 62 in the sidewall to the curved portion 56 which merges with the bead register 46.

The carcass structure 32 is wrapped around the bead core 30 and has its end portion 64 lying adjacent the main portion of the carcass structure 32. The turned up portion 64 terminates at a point 66 which is axially inwardly of the initial contact point 62 in the sidewall.

Further, as seen in FIG. 2, the carcass structure 32 approaches the bead core 30 at a very large angle $\beta$ with respect to the plane P that is tangent to the axially outer surface of the bead core 30. This angle $\beta$ is substantially greater than 45 degrees but no more than 90°. For most applications $\beta$ should be more than 60° and preferably at least 80°.

The tire according to the present invention may be built in a normal fashion by assembling the various components on a tire building form. The tire can then be shaped and cured in a mold under heat and pressure.

Figure 3:
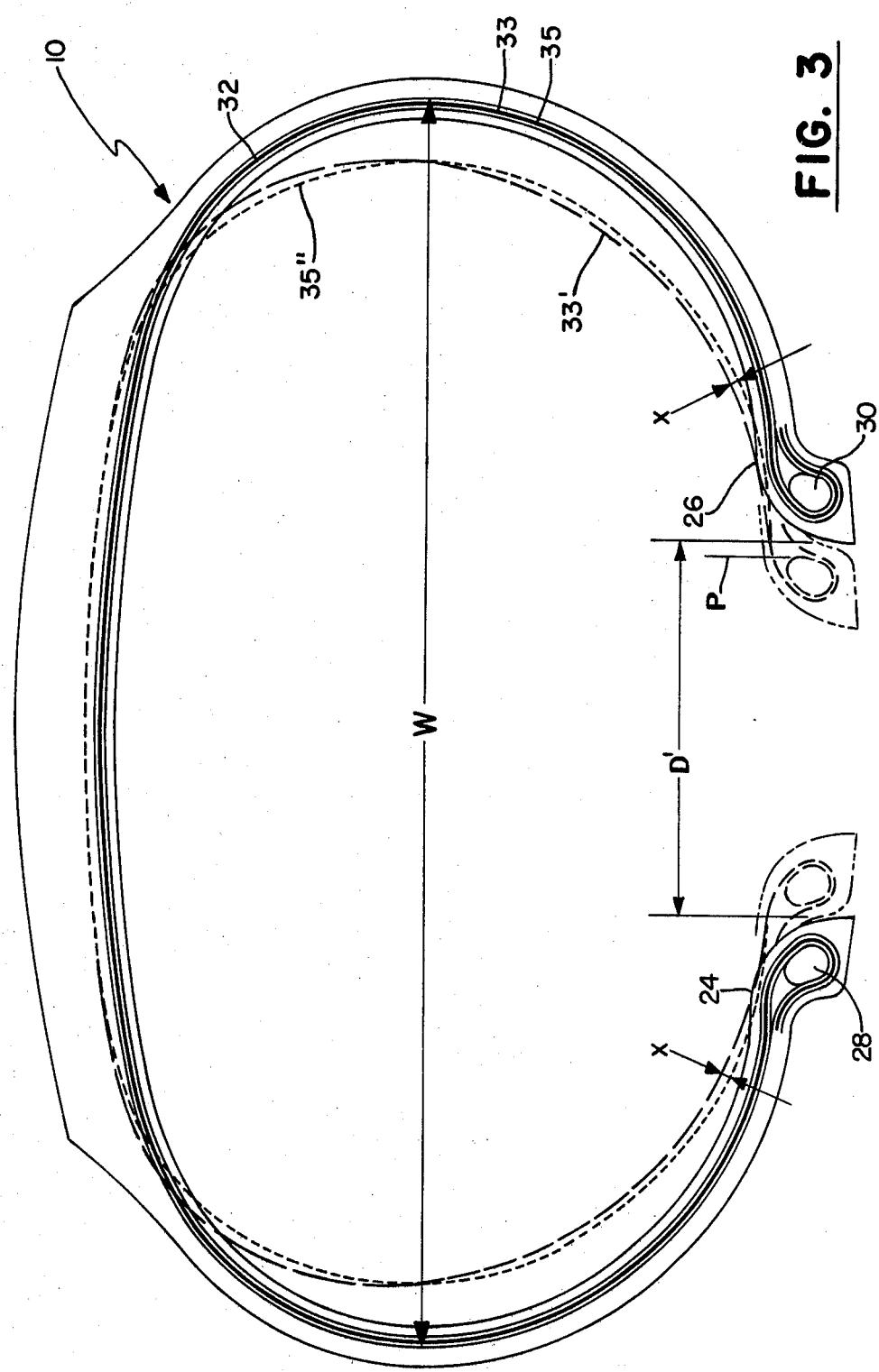
FIG. 3 is a view similar to that of FIG. 1 but illustrating the cured configuration of the tire relative to the inflated configuration.

In accordance with the present invention, the tire 10 is maintained in a specific configuration during vulcanization relative to the natural equilibrium configuration and the inflated configuration on the rim. Specifically, with reference to FIG. 3 the molded configuration is illustrated in solid lines and the inflated configuration is superimposed thereover in long dash lines. The neutral contour line 33 of the carcass structure 32 is illustrated in heavier lines than other portions of the tire in order to more clearly illustrate the inventive concept.

In accordance with the present invention the neutral contour line of a carcass ply is the center line of a wire or cord in the carcass ply as viewed in planes containing the rotational axis of the tire. If more than one carcass ply is present the neutral contour line shall be the center line of the composite of the carcass plies as viewed in planes containing the rotational axis of the tire. Thus, in the present invention the neutral contour line 33 is the line between the two carcass plies in the radial ply structure 32.

In accordance with the present invention, the tire 10 is maintained during vulcanization in a configuration in which the neutral contour line of the carcass structure 32 follows the natural equilibrium curvature 35 of the tire at least from the plane P tangent to the axially outer edges of the respective bead core substantially to the respective shoulder portion of the tire. The natural equilibrium curvature 35 of tires is well known and defined in the art and thus will not be discussed in detail herein. See for example, Chapter II, *Mathematics Underlying the Design of Pneumatic Tires*, by John F. Purdy, and *Theory for the Meridian Section of Inflated Cord Tire*, by R. B. Day and S. D. Gehman, Rubber Chemistry and Technology, Volume XXXVI, No. 1, Pp 11-27, January - March, 1963, also see U.S. Pat. No. 3,910,336 referred to previously, the teachings of which are incorporated herein by reference.

The tire being thus cured in the specific configuration, at least just as it is being removed from the mold, will tend to assume the configuration in which it was vulcanized. For purposes of this invention, the configuration of the tire in the mold which the tire tends to assume will be referred to as the relaxed configuration. It will be appreciated that this configuration will have to be determined with respect to the mold since the tire can be distorted after removal from the mold.

The tire after curing is mounted on a rim having a bead spacing D′ which is less than the bead spacing of the tire during curing. Since the tire has a narrower bead spacing on the rim it also has a different natural equilibrium curvature 35″ illustrated in short dash lines in FIG. 3. Unless specified otherwise herein, the natural equilibrium curvature of a tire shall be the natural equilibrium curvature for the tire with the rim bead spacing. The flanges of the rim are specifically designed to cause the neutral contour line of the carcass structure 32 to deviate from this natural equilibrium curvature 35″ to the actual inflated neutral contour line 33′ illustrated in long dashed lines. This provides a preloading on the axially extending flanges. The flanges, therefore, force the neutral contour line 33′ of the carcass structure radially outwardly from the natural equilibrium curvature 35″ for the tire with the bead spacing on the rim at least from a point just axially outwardly of the plane P at least to the point of maximum axial width of the tire.

The maximum amount of deviation x of the neutral contour line 33′ from the natural equilibrium curve 35″ measured perpendicularly to the neutral contour line in the area of the flange contact surface 51 will vary with the type of tire. For passenger tires the maximum deviation x should be from 0.01 to 0.06 inch (0.25 to 1.52 millimeters). For truck tires, the deviation x may be as much as 0.10 inch (2.54 millimeters) and for earthmover tires it may be as much as 0.20 inch (5.08 millimeters). These deviations are measured perpendicular to the flange contact surface and, further, when determining the contour of the flange contact surface allowance must be made for the compression modulus of the elastomer between the carcass structure 32 and the flange contact surface 51.

While in the particular embodiment illustrated the tread structure was illustrated as an integral part of the tire 10, it is possible that the tire 10 can be provided with a removable tread structure. Further, it is also contemplated that a removable track structure could be utilized in conjunction with the tire of the present invention.

While certain representative embodiments and details have been shown for the purpose of illustrating the invention, it will be apparent to those skilled in the art that various changes and modifications may be made therein without departing from the spirit or scope of the invention.

What is claimed is:

1. In a radial ply pneumatic tire and rim assembly;
   a. a rim including a pair of spaced annular bead seat surfaces, a radially extending annular bead register surface extending generally radially outwardly from the axially outer edge of each bead seat surface, and an annular stabilizer flange surface extending generally axially outwardly from the radially outer edge of each annular bead register surface;
   b. a pneumatic tire of the open-bellied type having a tread portion, a pair of sidewall portions, a pair of axially spaced apart bead portions each having an annular inextensible bead core, a carcass structure including at least one ply of inextensible cords extending continuously from one bead core to the other bead core and having a neutral contour line, and a circumferentially extending belt structure disposed circumferentially about said carcass structure; and
   c. said carcass structure, when said tire is mounted on said rim and inflated to design operating inflation pressure, having its neutral contour line displaced by said stabilizer flange radially outwardly from the natural equilibrium curve of the carcass structure at least from a point just axially outwardly of a plane tangent to the axially outer surface of the bead core at least to the point of maximum axial width of the tire with no reversal of curvature of said carcass structure, and further characterized by the angle of the carcass structure with respect to a plane tangent to the axially outer surface of each bead at said plane being greater than 60°.

2. A tire and rim assembly as claimed in claim 1 wherein the radially inner extremities of said carcass ply are turned axially outwardly about the respective bead cores and terminate within the axial extent of the contact area of said stabilizer flange.

3. A tire and rim assembly as claimed in claim 2 therein the spacing between said bead register surfaces is no greater than the 65 percent of the maximum axial width of the carcass structure when the tire is mounted on the rim and inflated.

4. A tire and rim assembly as claimed in claim 3 wherein said annular bead register surface extends in radial directions at least to 30 percent of the height of the adjacent bead core of the tire but no farther than the radially outer extremity of said adjacent bead core.

5. A tire and rim assembly as claimed in claim 1 wherein the spacing between said bead register surfaces is no greater than 65 percent of the maximum section width of the carcass structure when the tire is mounted on the rim and inflated.

6. A tire and rim assembly as claimed in claim 5 wherein said annular bead register extends in radial directions at least to the mid-height of the adjacent bead core of a tire but no farther than the radially outer extremity of said adjacent bead core.

7. A tire and rim assembly as claimed in claim 1 wherein each annular bead register surface extends in radial directions at least to 30 percent of the height of the adjacent bead core of a tire but farther than the radially outer extremity of said adjacent bead core.

8. A tire and rim assembly as claimed in claim 1 wherein the assembly is for use on passenger cars and maximum displacement of the neutral contour line from the natural equilibrium curve in the area of the stabilizer flange surface and measured perpendicular to said stabilizer flange surface is from 0.01 to 0.06 inch (0.25 to 1.52 millimeters).

9. A tire and rim assembly as claimed in claim 6 wherein the assembly is for use on passenger cars and maximum displacement of the neutral contour line from the natural equilibrium curve in the area of the stabilizer flange surface and measured perpendicular to said stabilizer flange surface is from 0.01 to 0.06 inch (0.25 to 1.52 millimeters).

10. A tire and rim assembly as claimed in claim 5 wherein the assembly is for use on trucks and maximum displacement of the neutral contour line from the natural equilibrium curve in the area of the stabilizer flange surface and measured perpendicular to said stabilizer flange surface is from 0.01 to 0.10 inch (0.25 to 2.54 millimeters).

11. A tire and rim assembly as claimed in claim 1 wherein the assembly is for use on earthmovers and the maximum displacement of the neutral contour line from the natural equilibrium curve in the area of the stabilizer flange surface and measured perpendicular to said stabilizer flange surface is from 0.01 to 0.20 inch (0.25 to 5.08 millimeters).

12. A tire and rim assembly as claimed in claim 1 wherein said tire has a relaxed configuration in which said neutral contour line follows a different natural equilibrium curve having a bead spacing greater than the bead spacing on the rim.

13. A tire and rim assembly as claimed in claim 5, wherein said tire has a relaxed configuration in which said neutral contour line follows a different natural equilibrium curve having a bead spacing greater than the bead spacing on the rim.

14. A tire and rim assembly as claimed in claim 8, wherein said tire has a relaxed configuration in which said neutral contour line follows a different natural equilibrium curve having a bead spacing greater than the bead spacing on the rim.

15. A tire and rim assembly as claimed in claim 9 wherein said tire has a relaxed configuration in which said neutral contour line follows a different natural equilibrium curve having a bead spacing greater than the bead spacing on the rim.

16. A tire and rim assembly as claimed in claim 10 wherein said tire has a relaxed configuration in which said neutral contour line follows a different natural equilibrium curve having a bead spacing greater than the bead spacing on the rim.

17. In a radial ply pneumatic tire and rim assembly;
   a. a rim including a pair of spaced annular bead seat surfaces, a radially extending annular bead resiter surface extending generally radially outwardly from the axially outer edge of each bead seat surface, and an annular stabilizer flange surface extending generally axially outwardly from the radially outer edge of each annular bead register surface;

b. a pneumatic tire of the open-bellied type having a tread portion, a pair of sidewall portions, a pair of axially spaced apart bead portions each having an annular inextensible bead core, a carcass structure including at least one carcass ply of inextensible cords extending continuously from one bead core to the other bead core and having a neutral contour line, and a circumferentially extending belt structure disposed circumferentially about said carcass ply;

c. said carcass ply, when said tire is mounted on said rim and inflated to design operating inflation pressure, having its neutral contour line displaced by said stabilizer flange radially outwardly from the natural equilibrium curve of said carcass ply of the tire at least from a point just axially outwardly of a plane tangent to the axially outer surface of the bead core at least to the point of maximum axial width of the tire with no reversal of curvature of said carcass ply, and further characterized by the angle of the carcass structure with respect to a plane tangent to the axially outer surface of each bead at said plane being greater than 60 degrees; and d. the contact area between each stabilizer flange surface and the sidewall of the tire extending in axial directions for a distance at least equal to 10 percent of the maximum axial width of the carcass structure of said tire when mounted on a rim and inflated.

18. A tire and rim assembly as claimed in claim 17 wherein the radially inner extremities of said carcass ply are turned axially outwardly about the respective bead cores and terminate within the axial extent of the contact area of the stabilizer flange surface.

19. A tire as claimed in claim 18 wherein the spacing between said bead register surfaces is no greater than 65 percent of the maximum axial width of the tire when mounted on the rim and inflated.

20. A tire and rim assembly as claimed in claim 19 wherein said annular bead register surface extends in radial directions at least to 30 percent of the height of the adjacent bead core of the tire but no farther than the radially outer extremity of said adjacent bead core.

21. A tire and rim assembly as claimed in claim 17 wherein the spacing between said bead register surfaces is no greater than 65 percent of the maximum section width of the tire.

22. A tire and rim assembly as claimed in claim 21 wherein said annular bead register surface extends in radial directions at least to 30 percent of the height of the adjacent bead core of the tire but no farther than the radially outer extremity of said adjacent bead core.

23. A tire and rim assembly as claimed in claim 17 wherein said annular bead register surface extends in radial directions at least to the mid-height of the adjacent bead core of the tire but no farther than the radially outer extremity of said adjacent bead core.

24. A tire and rim assembly as claimed in claim 17 wherein said tire has a relaxed configuration in which said neutral contour line follows a different natural equilibrium curve having a bead spacing greater than the bead spacing on the rim.

25. A tire and rim assembly as claimed in claim 21 wherein said tire has a relaxed configuration in which said neutral contour line follows a different natural equilibrium curve having a bead spacing greater than the bead spacing on the rim.

26. A tire and rim assembly as claimed in claim 23 wherein said tire has a relaxed configuration in which said neutral contour line follows a different natural equilibrium curve having a bead spacing greater than the bead spacing on the rim.

* * * * *